April 5, 1949.  M. R. HUTCHISON, JR  2,466,430
CONSTRUCTION FOR PROJECTION LAMPS
Filed March 31, 1945

MILLER R. HUTCHISON, JR.
INVENTOR

BY
ATTORNEYS

Patented Apr. 5, 1949

2,466,430

UNITED STATES PATENT OFFICE 2,466,430

CONSTRUCTION FOR PROJECTION LAMPS

Miller R. Hutchison, Jr., Rochester, N. Y., assignor to Eastman Kodak Company, Rochester, N. Y., a corporation of New Jersey Application March 31, 1945, Serial No. 585,961

10 Claims. (Cl. 250—85)

This invention relates to a construction particularly applicable to still and motion picture projectors. One object of my invention is to provide an improved means for reducing the cooling air requirements of projection apparatus. Another object of my invention is to provide a lamp housing minimizing the escape of stray light from the projector. Still another object of my invention is to provide a lamp housing in which the filament is so mounted that a beam of visible rays may pass from the housing in a projection beam and so that heat radiations may be directed from the lamp housing in another direction so as to effect a reduction in the heating of the lamp house. Other objects will appear from the following application, the novel features being particularly pointed out in the claims at the end thereof.

In the ordinary projection lamp, about 12 per cent of the electrical energy supplied is converted into visible radiations while about 88 per cent becomes heat rays. The principal difficulties in projection apparatus are: to direct the visible radiations through the picture film; to prevent heat radiations from striking the picture film; to maintain the lamp envelope temperature sufficiently low to prevent deformation by internal gas pressure; to prevent the escape of stray light into the projection room and to dispose of the waste heat without overheating the apparatus.

In the conventional projection apparatus, the projection lamp is a gas-filled envelope of heat-resisting clear glass containing an incandescent filament using up to 10,000 watts of electrical energy. It is oriented between a condenser lens and a spherical mirror which act to direct a portion of the visible light and heat rays through the picture film. It is confined within a lamp house, or flue, having opaque metallic side walls, through which an air current is moved by a motor-driven blower. The air usually exhausts upward through the top of the lamp house and with it a considerable amount of stray light. Being exposed to the radiant heat from the filament, the lamp house becomes very hot and requires a large amount of cooling air flow to prevent its becoming dangerous to the touch. It also reflects back upon the lamp a considerable part of the incident heat rays. This increases the temperature of the lamp envelope which absorbs about 10 per cent of any radiations to which it is exposed. The motor power required to provide the necessary air displacement in such apparatus may equal, or exceed, that required to operate the film transport mechanism in the amateur motion picture projector and the noise produced by the blower often is objectionable.

My present invention is particularly directed to a construction for projection lamps which will reduce greatly the present difficulties. My device will permit a considerably reduced air circulation, with less attendant noise, without exceeding the present working temperature of the lamp envelope. My device also will permit the substitution of an open-mesh guard for the conventional lamp house, with incidental saving of weight and cost of apparatus, without allowing the escape of stray light from the projector.

My present invention is particularly directed to a construction for projection lamps which will greatly reduce the present difficulties in cooling the projection lamp, and which will permit a considerably reduced circulation of air even with the preferred air-cooled types of lamps now known. My device will make it possible to eliminate the present type of metal lamp house designed primarily to exclude unwanted light rays, and to substitute therefore a wire screen or the like to prevent bodily contact with the projection device.

Coming now to the drawings wherein like reference characters denote like parts throughout:

Figure 1:
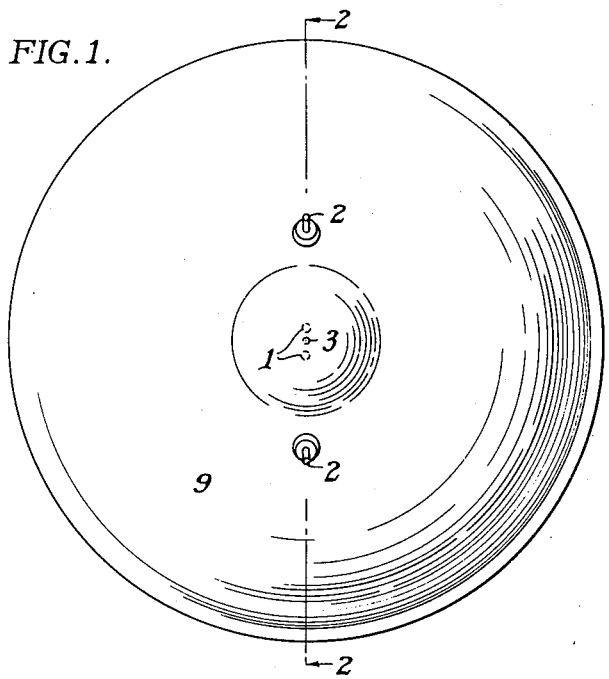
Figure 1 is a front elevation of a construction for projection lamps embodying a preferred form of my invention.

In accordance with the preferred embodiment of my invention, a construction for projection lamps may consist of a lamp filament 1 which may be of any preferred type. This filament may be connected to suitable terminals 2 and may be supported by a supporting rod 3 and opposed supporting rods 4 and 5 which are, in this case, mounted about a window 6 through which a projection beam of visible light rays 7 may pass. In this embodiment of my invention the window 6 is covered with a condensing lens 8 which may collimate the light rays from the filament 1. Lens 8 may be one element of a suitable condenser system.

I provide a lamp housing about the filament 1.

Figure 2:
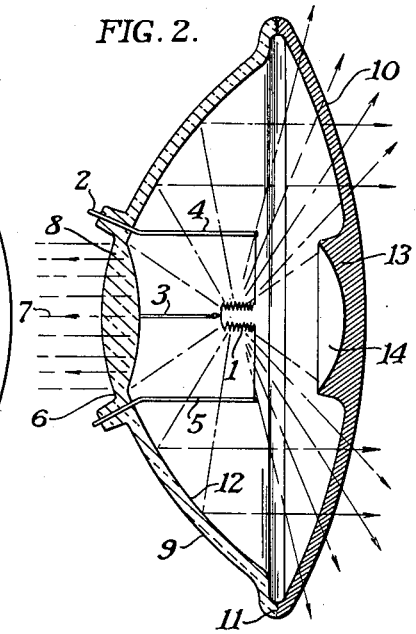
Figure 2 is a section taken on line 2—2 of Figure 1.

In Figures 1 and 2 this lamp housing is shown as including generally circular walls 9 and 10 which may be fused together at their peripheries at 11. The wall 9 preferably contains a reflecting coating 12 on the inside such as an aluminum, or other suitable material. This surface is preferably parabolic in shape. It is desirable, although not necessarily essential, to make the housing wall 9 of heat-resisting glass. The condenser lens 8 may be formed of the same material as the wall 9 to improve its cooling.

The wall 10 of the lamp housing is preferably made of filter glass which is adapted to pass invisible heat rays and to absorb visible rays. This wall of the housing preferably includes a reflector 13 having a reflecting coating 14 so as to reflect light rays used in the visible projection beam forwardly and through the condenser lens 8. The reflector 13 is preferably made of the material of the filter wall 10 to improve its cooling.

There is a number of suitable filter glasses available designed to absorb practically all of the visible rays and to transmit a very large portion of the infrared invisible rays so that a large portion of the heat rays formed by the lamp filament 1 can be directed by the reflecting surface 12 through the filter wall 10 of the housing. Much radiant heat can thus be dissipated without permitting visible rays to pass into the room where the projector is located.

Figure 5:
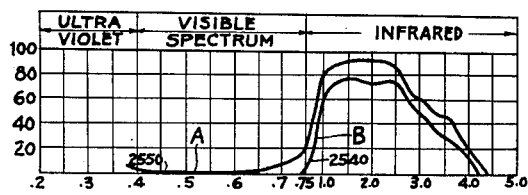
Figure 5 is a diagram showing the transmission of certain types of available filter glasses which may be used in carrying out my invention.

It is obvious that it is not necessary to exclude all of the visible rays although it is, of course, desirable to do so. Figure 5 illustrates a chart showing the transmission of two suitable types of glass for the housing wall 10, these two graphs being marked "A" and "B." From this chart it will be noticed that the graph "A" illustrates a glass which passes only an extremely small portion of the visible spectrum and it will be noted that in the infrared region around 90 per cent or more of the infrared rays are transmitted.

The "B" graph shows a second type of glass which does not transmit quite such a large proportion of invisible rays but, nevertheless, transmits around 70 per cent. The "A" graph shows the transmission of a glass made by the Corning Glass Works of Corning, New York, which is known as "2550" glass, and the "B" graph shows glass made by the same people known as "2540." Other makes of glass may be found to have the same general characteristics but these two specific glasses are mentioned as being suitable for my purpose.

It will be noticed from Figures 1 and 2 that there is a means for directing the visible rays into a projection light beam, passing through the window 6, this means consisting in this embodiment of my invention of the reflector 14 and the condenser lens 8. There is likewise a means for directing invisible rays through the filter wall 10; this means comprising the parabolic reflector 12 which directs rays other than those used in the projection beam in another direction from that of the projection beam. In this embodiment of my invention the rays directed to the filter wall 10 pass in a substantially opposite direction to the rays from the projection beam.

Figure 3:
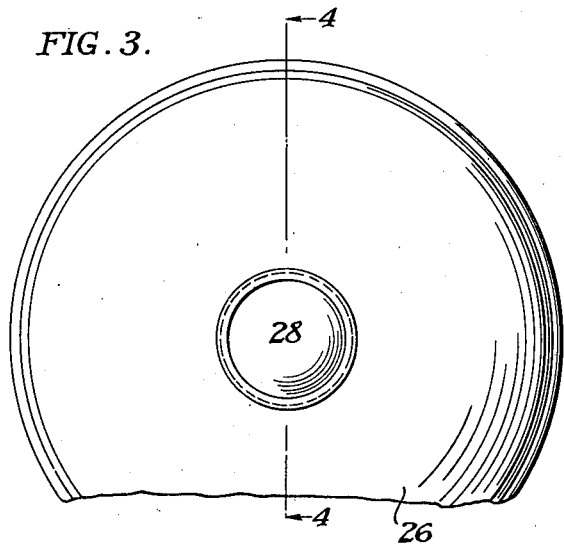
Figure 3 is a view finder similar to Figure 1, partially broken away, and showing a construction for projection lamps illustrating a second embodiment of my invention.
Figure 4:
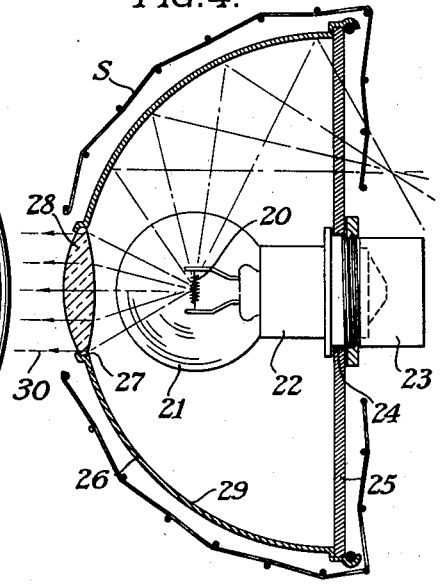
Figure 4 is a section taken on line 4—4 of Figure 3.

In a second embodiment of my invention, as illustrated in Figures 3 and 4, the construction for the projection lamp may consist of a lamp filament 20 which, in this instance, may be carried by a projection lamp bulb 21 having the usual type of base 22 which may fit into a suitable socket 23. The socket 23 is carried in an aperture 24 and the lamp housing consists of a wall 25 formed of a suitable filter glass such as described above, and a wall 26 which is provided with a window 27 for the passage of the visible projection light beam. I prefer to provide a condenser lens 28 in the window 27 although if desired this condenser may be mounted outside of the wall 26 in which case the window 27 might be in the form of a simple aperture.

The wall 26 in this instance may be a simple spherical reflector, preferably having a suitable reflecting surface 29. Surface 29 directs the rays from the filament 21 that are not used in the projection beam 30 through the filter wall 25. As in the first embodiment of my invention, wall 25 is of a filter glass which will pass 70 or more per cent of the infrared rays and which will exclude all, or approximately all, of the visible rays. In this embodiment of my invention a reflector for reflecting light rays used for the visible projection beam is omitted. If desired a vertically mounted lamp with a reflector can be used.

Since the heat rays pass but once through the lamp envelope, the temperature of the latter will be lower than when a conventional type of lamp house is provided. By providing a screen S, as of wire mesh, bodily contact with the lamp house is prevented. Thus the usual opaque all metal lamp house which excludes visible light but which causes over heating may be entirely omitted. The protecting wire screen S absorbs very little heat and remains reasonably cool.

In the specification and claims where I refer to a lamp house, I intend this term to include a lamp house in which the housing itself is the lamp envelope as in Figures 1 and 2 or a lamp housing which may enclose a standard form of projection lamp in a separate envelope as illustrated in Figures 3 and 4. In both of these forms of my invention the visible radiations pass from the lamp housing in one direction to form a projection beam, while the invisible radiant heat is directed in another direction passing out through the filter wall of the lamp house. I prefer to expose the filter wall of the lamp house in the room where the projection takes place and to direct the radiant heat in a direction which will not contact any part of the projection machine so that my improved construction for projection lamps may dispose of the greater part of the waste heat from the projection lamp while a large part of the visible rays are utilized as the projection beam.

It is, of course, desirable to direct as much of the radiant heat as possible from the lamp housing and it is also desirable to have the filter wall of the housing absorb as much of the unused visible portion of the spectrum as possible although, usually, a small amount of visible light is not particularly distracting in a darkened room where projection occurs. It is of course desirable to utilize for the projection light beam as large a proportion of the visible light as possible. This is generally done with known projection lamp systems, but the difficult part is to dispose of the unused radiations, visible and invisible, and it is in this that my projection device is particularly desirable.

It is possible to entirely eliminate the customary opaque metal lamp house which is primarily used to confine or restrict visible rays. Such lamp houses result in overheating the lamp and require cooling systems. All that my projection device requires is a netting or screen to prevent body contact with the special type of lamp house described hereinabove.

While I have illustrated and described several embodiments of my invention, it is obvious that many forms of lamp houses may be required to suit the various different projectors which may be used and such lamp houses can readily be designed utilizing the ideas of providing a housing which directs a projection beam of light in one direction and which directs as by means of suitable reflectors invisible heat rays from the lamp housing in another direction. Both of the embodiments described and illustrated herein illustrate typical examples of such a cooling construction for projection lamps. I consider as within the scope of my invention all such forms as may come within the scope of the appended claims.

I claim:

1. A construction for projection lamps, comprising, in combination, a lamp filament, a lamp house extending about the filament, a window in the lamp house through which a projection beam may pass, a reflecting surface carried by one wall of the lamp house, an infrared transmitting visible absorption filter constituting another wall of the lamp house forming a window in the lamp house through which infrared radiation may pass.

2. A construction for projection lamps in accordance with claim 1 characterized by a lens in the window through which the projection beam passes.

3. A construction for projection lamps in accordance with claim 1 characterized by a second reflector carried by the lamp house for directing light rays from the filament into the projection beam.

4. A construction for projection lamps in accordance with claim 1 characterized by the lamp house reflecting surface including the window in the lamp house through which a projection beam may pass, and a condensing lens covering said window.

5. A construction for projection lamps in accordance with claim 1 characterized by the lamp house reflecting surface having the window therein and a second reflector carried by the lamp house and positioned to reflect a projection beam of light through the window and in a different direction from the rays reflected by the first-mentioned reflecting surface.

6. A construction for projection lamps comprising, in combination, a lamp filament, a lamp house extending about the lamp filament, reflectors carried by walls of the lamp house, an infrared transmitting visible absorption filter forming a wall of the lamp house, one reflector directing rays from the filament into a projection beam, the other reflector directing rays from the filament towards the filter whereby said filter may pass invisible rays from the lamp.

7. A construction as called for in claim 6 characterized by the lamp house being of the type in which the lamp filament is hermetically sealed inside of the lamp house.

8. A construction for projection lamps comprising, in combination, a lamp filament, a lamp house extending about the lamp filament, a reflector forming one wall of the lamp house, a filter forming another wall of the lamp house, a window through which visible light rays may pass, said reflector directing light rays passing outside of the light beam of visible rays passing through the window to the filter which constitutes a second window, said filter having the property of passing only invisible rays from the lamp house.

9. A construction for projection lamps including, in combination, a filament lamp, a lamp housing in which the filament lamp is mounted, a window through which visible rays of a projection beam may pass, a reflector extending about said window and forming a wall of said lamp housing, an infrared transmitting visible absorption filter forming another wall of the lamp housing and constituting a second window, said reflector directing rays to the filter whereby invisible rays may pass from the housing.

10. A construction for projection lamps in accordance with claim 1 characterized by the means for directing invisible rays from the housing including an infrared visible absorption filter having the characteristic of absorbing practically all of the visible light while maintaining a transmission of the infrared in the order of more than seventy per cent.

MILLER R. HUTCHISON, JR.

REFERENCES CITED

The following references are of record in the file of this patent:

UNITED STATES PATENTS

| Number | Name | Date |
| --- | --- | --- |
| 1,342,894 | Bugbee | June 8, 1920 |
| 2,078,986 | Young | May 4, 1937 |
| 2,088,544 | Braselton | July 27, 1937 |